P. Boice,
Cleansing Walks.
No. 112,012. Patented Feb. 21, 1871.
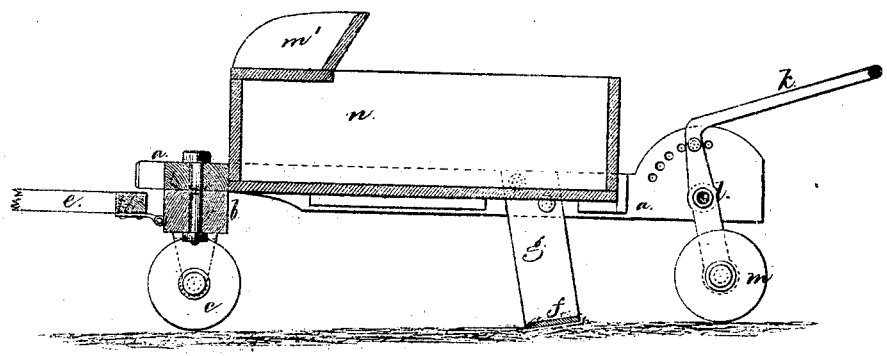
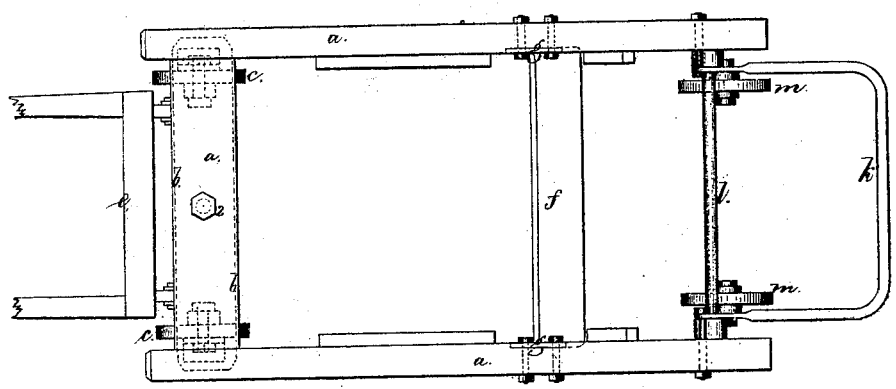

UNITED STATES PATENT OFFICE.

PETER BOICE, OF CHATHAM VILLAGE, NEW YORK.

IMPROVEMENT IN MACHINES FOR CLEANING GARDEN-WALKS.

Specification forming part of Letters Patent No. 112,012, dated February 21, 1871.

*To all whom it may concern:*

Be it known that I, PETER BOICE, of Chatham Village, in the county of Columbia and State of New York, have invented an Improvement in Machines for Cleaning Walks, &c.; and the following is declared to be a correct description of the same.

This machine is for the purpose of cutting up weeds and grass and loosening the surface in roads and paths, so that they may be cleaned by raking or otherwise, and said machine is also adapted to cutting sods.

I make use of a frame that is mounted at the forward end upon wheels and an axle turning upon a king-bolt, and to which the power is applied, and to this frame a horizontal cutter is attached by side pieces, and the rear end of the frame is adjustable in position vertically by wheels set in a swinging yoke, so that the depth of cut can be regulated as desired, or the cutter raised entirely clear of the roadway or walk.

In the drawings, Figure 1 is a vertical section of my scraper as in position for use; and Fig. 2 is a plan of the same, the weight-box being removed.

The frame $a$ is of suitable size, and connected by the bolt 2 with the axle $b$, sustained by the wheels $c$, and to this axle $b$ the shaft or tongue $e$ is attached.

The scraper is made of the horizontal knife $f$, with the ends turned up vertically to form the side bars, $g$, which extend to and are bolted upon the frame $a$.

At the rear end of the frame $a$ is a yoke, $k$, set to swing on the bolt $l$, and at the ends of this yoke are wheels $m$, set upon gudgeons.

The driver's seat $m'$ should be provided, and this may be upon a box, $n$, that is loaded with stones or other weight.

The under side of the knife is beveled upward and the forward edge sharpened, so as to cut off weeds or grass at the surface of the path or at any desired depth below the surface, and the knife is kept sharp to a considerable extent by the action of the earth against the under side.

The surface of the earth is more or less loosened by this machine, and with paths or walks the machine will cut close to a border, because the knife is as wide as the distance between the wheels, and in consequence of the front wheels swiveling the knife can be made to cut close to the edge in the sharp turns of walks or roads.

This machine can be used for cutting sod into strips for removal or for other agricultural or horticultural purposes.

I claim as my invention—

The knife $f$, of the character specified, connected to the frame $a$ and supported by the swinging axle $b$ and wheels $c$, and adjustable in the depth of cut by the yoke $k$ and wheels $m$, as and for the purposes set forth.

Signed by me this 27th day of December, 1870.

PETER BOICE.

Witnesses:
S. M. JEWELL,
N. R. SIMMONS.